United States Patent
Tian

(10) Patent No.: US 10,762,273 B2
(45) Date of Patent: Sep. 1, 2020

(54) COMMENT DISPLAY METHOD, A COMMENT DISPLAY SYSTEM, AN ELECTRONIC DEVICE, AND A READABLE STORAGE MEDIUM

(71) Applicant: Alibaba Group Holding Limited, Grand Cayman (KY)

(72) Inventor: Yuan Tian, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 15/971,120

(22) Filed: May 4, 2018

(65) Prior Publication Data
US 2018/0322098 A1 Nov. 8, 2018

(30) Foreign Application Priority Data

May 5, 2017 (CN) .......................... 2017 1 0312945

(51) Int. Cl.
G06F 17/00 (2019.01)
*G06F 40/103* (2020.01)
*G06F 40/169* (2020.01)

(52) U.S. Cl.
CPC .......... *G06F 40/103* (2020.01); *G06F 40/169* (2020.01)

(58) Field of Classification Search
None
See application file for complete search history.

(56) References Cited

U.S. PATENT DOCUMENTS

| 9,876,741 | B1 * | 1/2018 | Taboriskiy | H04L 51/046 |
| 2010/0122309 | A1 * | 5/2010 | Kawakami | H04N 7/17318 725/116 |
| 2013/0054699 | A1 * | 2/2013 | Macaskill | G06Q 10/101 709/204 |
| 2014/0012910 | A1 * | 1/2014 | White | H04N 21/4788 709/204 |
| 2014/0013200 | A1 * | 1/2014 | White | H04N 21/235 715/230 |
| 2014/0337126 | A1 * | 11/2014 | Ohanyan | G06Q 30/0251 705/14.49 |
| 2017/0142044 | A1 * | 5/2017 | Ball | G06F 16/23 |
| 2018/0048721 | A1 * | 2/2018 | Barajas Gonzalez | G06F 16/90332 |
| 2018/0150450 | A1 * | 5/2018 | Wei | G06F 17/241 |

* cited by examiner

*Primary Examiner* — Mustafa A Amin
(74) *Attorney, Agent, or Firm* — Alston & Bird LLP

(57) ABSTRACT

Disclosed is a comment display method, a comment display system, an electronic device, and a readable storage medium. The method comprises the following: in a comment area of a display page, statically displaying a first plurality of user comments arranged according to a first rule; and on the statically displayed user comments, superimposing a second plurality of dynamically displayed user comments, wherein, the second plurality of user comments are selected according to a second rule. Thus, the superimposing of static and dynamic display of user comments diversify the display of comments.

16 Claims, 3 Drawing Sheets

In a comment area, statically displaying a first plurality of user comments — S210

On the statically displayed user comments, superimposing a second plurality of dynamically displayed user comments — S220

COMMENT DISPLAY METHOD, A COMMENT DISPLAY SYSTEM, AN ELECTRONIC DEVICE, AND A READABLE STORAGE MEDIUM

CROSS-REFERENCE TO RELATED APPLICATION

The present invention claims priority to and benefit of Chinese Patent Application No. 201710312945.0, filed with the State Intellectual Property Office (SIPO) of the People's Republic of China on May 5, 2017, the entire content of which is incorporated by reference into the present application.

TECHNICAL FIELD OF THE INVENTION

The present invention relates to the field of information technology, in particular to a comment display method, a comment display system, an electronic device, and a readable storage medium.

BACKGROUND OF THE INVENTION

With the rapid development of network technology, users often interact with other users to obtain more information by making comments on certain content (for example, products, hot topics and forums, etc.) or replying to comments in the comment area.

However, currently user comments are displayed in a single manner, and it is difficult for other users to simultaneously obtain multiple user comments that are displayed in different ways. For example, top comments (such as comments sorted and displayed according to the number of user comments being commented, the number of positive comments, or the amount of thumbs-up, etc.) and all comments (such as comments sorted and displayed according to the time when the user comments were posted) cannot be shown at the same time. Moreover, the existing comment display solution is difficult to motivate users to actively post comments, and and it is also difficult to guarantee the quality of the posted comments.

Therefore, there is a need for a comment display solution capable of solving at least one of the above problems.

SUMMARY OF THE INVENTION

An object of the present invention is to provide a comment display method, a comment display system, an electronic device, and a readable storage medium that can diversify a comment display by superimposing dynamically displayed user comments, thereby promoting an active and interactive commenting atmosphere. Other users can reward user comments that are displayed dynamically, thereby inspiring users to actively post high-quality comments.

According to an aspect of the present invention, a comment display method is provided, comprising the following: in a comment area of a display page, statically displaying a first plurality of user comments arranged according to a first rule; and on the statically displayed user comments, superimposing a second plurality of dynamically displayed user comments, wherein, the second plurality of user comments are selected according to a second rule.

Therefore, by superimposing dynamically displayed user comments in a comment area, other users can, at the same point in time, view those user comments displayed therein according to different rules, thereby enriching the manner to display user comments and promoting an active and interactive commenting atmosphere.

Preferably, dynamic display can comprise: entering from one side of the comment area, drifting horizontally to the other side and leaving. That is, dynamic display is preferably performed in the form of barrages, and other dynamic display modes may also be used.

Preferably, the first rule and the second rule are formulated on the basis of at least one of the following: the number of positive comments on a user comment, the number of negative comments on a user comment, the time when the user comments were posted, and the level of users who posted the user comments, and the first rule and the second rule at the same point in time are at least not exactly the same, and the first plurality of user comments selected according to the first rule and the second plurality of user comments selected according to the second rule are at least not exactly the same.

Thus, the optimal and up-to-date comments can be rationally screened, and it can be guaranteed that the dynamically displayed comments and the statically displayed comments are at least not exactly the same.

Preferably, superimposing a second plurality of dynamically displayed user comments on the statically displayed user comments can comprise: dynamically displaying multiple groups of different comments from the second plurality of user comments in a rolling format, wherein, each group of comments from the second plurality of user comments are selected according to at least one of the following: the number of positive comments on a user comment, the number of negative comments on a user comment, the time when the user comments were posted, and the level of users who posted the user comments.

By rolling the user comments according to different rules, it is possible to enrich the contents of the dynamically displayed comments, to make the comment display richer and more interesting, and to achieve reasonable motivation for various types of users in different dimensions.

Preferably, when dynamically displayed, any of the second plurality of user comments can be selected and rewarded by other users.

As a result, since a rewarding feature is introduced to increase user engagement, users are encouraged to post high-quality comments.

The comment area may be, for example, an existing comment area attached to the text content. However, preferably the comment area can be a public screen comment area displayed separately from a commented content. Thus, by introducing a new "public screen" and using the "upper public screen" as an exposure position for user comments, users are encouraged to actively post high-quality comments.

According to a further aspect of the present invention, a comment display system is provided, comprising the following: a static display unit, used for, in a comment area of a display page, statically displaying a first plurality of user comments ranked according to a first rule; and a dynamic display unit, used for, on the statically displayed user comments, superimposing a second plurality of dynamically displayed user comments, wherein, the second plurality of user comments are selected according to a second rule.

Preferably, the dynamic display unit is capable of dynamic display in which user comments enter from one side of the comment area, drift horizontally to the other side and leave.

Preferably, the dynamic display unit further comprises a rolling display sub-unit, and the rolling display sub-unit dynamically displays multiple groups of different comments from the second plurality of user comments in a rolling format, wherein, each group of comments from the second plurality of user comments are selected according to at least one of the following: the number of positive comments on a user comment, the number of negative comments on a user comment, the time when the user comments were posted, and the level of users who posted the user comments.

Preferably, the system can further comprise: a rewarding unit, used for selecting any of the second plurality of user comments and giving a reward.

According to a further aspect of the present invention, an electronic device is provided, comprising the following: a display screen; a processor; and a memory unit, on which an executable code is stored, and when the executable code is executed by the processor, the processor will execute the above-mentioned comment display method, so that a comment display will be realized on a display page of the display screen.

According to a further aspect of the present invention, a non-transitory machine-readable storage medium is also provided, on which an executable code is stored, and when the executable code is executed by the processor of the electronic device, the processor will execute the above-mentioned comment display method.

The comment display method, the comment display system, the electronic device, and the readable storage medium provided in the present invention enable superimposing of dynamically displayed user comments on the statically displayed user comments so that a comment area of a display page can simultaneously display a plurality of user comments selected according to different rules, thereby diversifying a comment display and promoting an active and interactive commenting atmosphere. Other users can reward user comments that are displayed dynamically, so that quality commenting users can be recognized, thereby inspiring users to actively post high-quality comments.

BRIEF DESCRIPTION OF THE FIGURES

The above and other objects, features and advantages of the present disclosure will become more apparent from the following detailed description of exemplary embodiments of the present disclosure with reference to the accompanying drawings, wherein, in the exemplary embodiments of the present disclosure, the same reference numerals generally represent the same components.

DETAILED DESCRIPTION OF THE EMBODIMENTS

The preferred embodiments of the present disclosure will be described below in more detail with reference to the accompanying drawings. Although the drawings show preferred embodiments of the present disclosure, it should be understood that the present disclosure may be implemented in various forms and should not be limited by the embodiments described herein. Rather, these embodiments are provided to make this disclosure more thorough and complete and to fully convey the scope of the disclosure to those skilled in the art.

In order to solve the problems that the existing comment display solution has a single display form and it is difficult to guarantee the comment quality, the present invention proposes a new comment display solution. In the solution, a first plurality of user comments are statically displayed in a comment area of a display page, and a second plurality of dynamically displayed user comments are superimposed on the statically displayed user comments so as to simultaneously display to the user a plurality of user comments selected according to different rules, to achieve a diverse display of user comments, and to inspire the users to actively post comments. Furthermore, other users can reward user comments that are displayed dynamically, so that quality commenting users can be recognized, thereby inspiring users to actively post high-quality comments.

The technical solution of the present invention will be described in detail below with reference to the accompanying drawings and embodiments.

Figure 1:
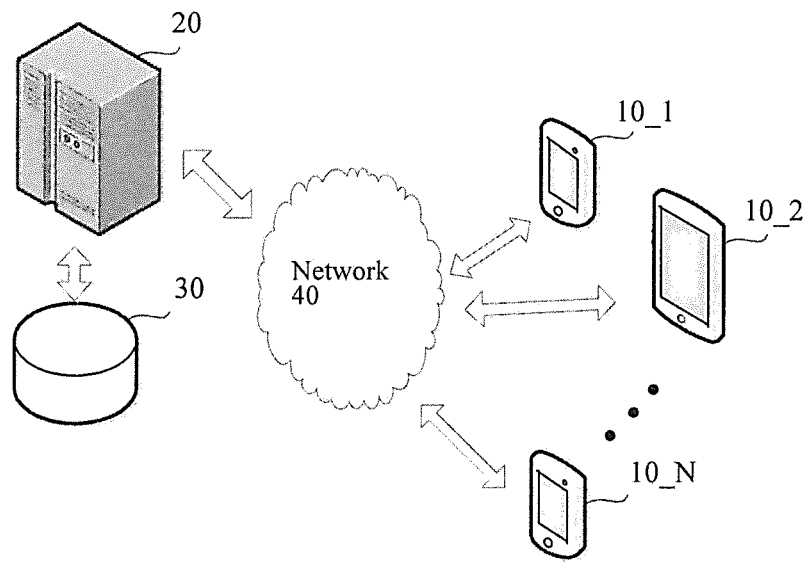
FIG. 1 shows a schematic diagram of an environment in which the present invention is implemented.

The comment display solution of the present invention can be applied to the environment shown in FIG. 1, a schematic diagram of an environment in which the comment display solution of the present invention is implemented. In one embodiment, the information transmitting and receiving between a terminal 10 in the environment and a server 20 can be realized via a network 40. The server 20 can acquire content (e.g., user comments, etc.) required by the terminal 10 by accessing a database 30. The network 40 may be a network for information transfer in a broad sense, and may include one or more communication networks such as a wireless communication network, the Internet, a private area network, a local area network, a metropolitan area network, a wide area network, or a cellular data network, among others. It should be noted that the underlying concepts of the exemplary embodiments of the present invention will not be changed if additional modules are added to or removed from the illustrated environment. In addition, although a bidirectional arrow from the database 30 to the server 20 is shown in the figure for convenience of explanation, those skilled in the art can understand that the above data can be transmitted and received through the network 40.

The terminal 10 is any suitable electronic device that can be used for network access, preferably a portable electronic device, especially a portable electronic device with a touch screen; including but not limited to a smart phone, a notebook computer, a desktop computer, or other clients. The server 20 is any server that can be accessed through the network and provides information needed for interactive services. The database 30 may store a user's data or information submitted by the user or automatically acquired by the mobile terminal, such as the data about the user's basic information, the data about comment interaction, the data about the user's personal comment level, and the like. In the following description, one or a part of the mobile terminals will be selected for description (for example, terminal 10-1), but those skilled in the art should understand that the above 1 . . . N mobile terminals are intended to represent a large number of mobile terminals that are present in the real network, the illustrated single server 20 and database 30 are intended to indicate that the technical solution of the present invention relates to server and database operations. The specific numbered mobile terminals and individual server and database are described in detail for ease of illustration and are not meant to imply limitations on the type or location of mobile terminals and servers.

The comment display method of the present invention is described in detail below with reference to FIG. 2 and an embodiment.

Figure 2:
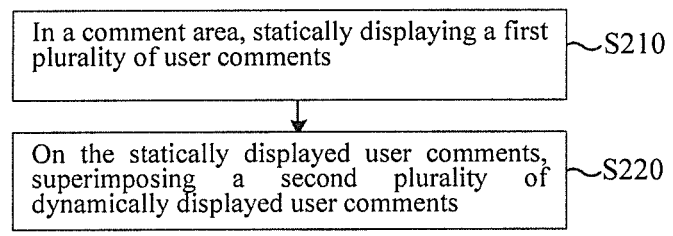
FIG. 2 shows a schematic flow chart of a comment display method according to an embodiment of the present invention.

FIG. 2 shows a schematic flow chart of a comment display method according to an embodiment of the present invention. This method can be implemented via any terminal 10 shown in FIG. 1.

In step S210, a first plurality of user comments selected according to a first rule are statically displayed in a comment area of a display page.

The display page may be a page displayed on the client display screen to present a user with some content that can be viewed by the user, wherein, the content may be shown in multiple forms, and may be text content, graphic content, picture content, or the like, or may be some content from Weibo, WeChat Moments, etc., and may also be some content about a product, a hot topic, etc., or may be other content.

A comment area is an area common in the prior art that displays the comment content or provides an opportunity to edit the comment content, usually after the text content. A user can post user comments in the comment area, and can also comment any user comments posted by other users in the comment area, so as to interact with other users. As detailed below, the comment area can also be a special "public screen".

The static display may be a "static" display in the comment area common in the prior art, that is, the display position of each comment on the page is relatively fixed and does not change by itself. Even if the page refresh introduces new comments, or the relative position of comments changes, the overall display of comments should still be considered as "static". The first rule refers to the rule for selecting and/or arranging the first plurality of statically displayed user comments, and the first rule can be based on but not limited to the number of positive comments on a user comment, the number of negative comments on a user comment, the time when the user comments were posted, and the level of users who posted the user comments, and the like. The "first" rule and the "first" plurality of user comments herein are intended to be distinguished from the subsequently dynamically displayed rules and comments, rather than implying the order or the like.

A user comment is a comment posted by a user (e.g., a registered user) on a certain content, and may typically include a text comment, a picture comment, an inserted colorful text or facial expression, and the like. When a user comment is displayed, the user ID who posted the comment is usually displayed as well. In other embodiments, the amount of thumbs-up, the amount of thumbs-down the comment reply, and/or the user level may also be displayed together. The first plurality of user comments are multiple user comments that are selected and arranged from all comments according to the first rule. When the first rule stipulates that all comments are selected, the first plurality of user comments may also be all user comments, for example, comments arranged according to the number of positive comments, comments arranged according to the time of comment posting, or the above two types of comments that are separately displayed in a separate screen or by pull-ups. The first plurality of user comments may also be the top N user comments selected based on the number of positive comments on a user comment, and all user comments and the like that are arranged in a separate screen and arranged from the recent to the oldest according to the time of comment posting.

When the first rule includes a plurality of selection modes, weights may be assigned to different selection modes, and the first plurality of user comments selected according to different selection modes may be statically displayed in the comment area. For example, the first plurality of user comments quantitatively consists of 40% of praised comments (based on the number of positive comments attached thereto), 30% of recent comments (based on the time when the user comments were posted), and 30% of high-quality users (based on the level of users who posted the user comments).

The server needs to maintain a database (for example, the database shown in FIG. 1) for storing user comments and related information, and the database can also be extended subsequently. The database may include a basic comment information database storing user comments posted by different users. The basic comment information database may contain, but is not limited to, basic information of a user, such as the comment ID of a user who posted a comment, the commenting user, the time of posting, and whether or not any reply is given to comments of other users, among others.

Other users can comment or reply to user comments so as to promote user interaction. The database may also contain a comment interaction information database storing comment interaction data about comments of other users on a comment of a user. The interaction information database may contain, but is not limited to, comment IDs of other users who comment a user comment, and data of positive comments (e.g., thumbs-up data) and negative comments of other users on a user comment, among others.

According to the amount, quality and other factors of a user's commenting on a certain content, the commenting users can be divided into different user levels. The database may also store the personal data about the user level. The user level data is a kind of rating data for measuring the quantity and quality of a user's comments on certain content, for example, the comment ID of a user who posted a comment, his commenting level and total number of comment, among others.

When a user checks certain content, the server may check the user comments under the content from the database in response to the user's operation, select a first plurality of user comments according to a first rule, and send the first plurality of user comments and related data or information to a mobile terminal for static display on the comment area.

In step S220, a second plurality of dynamically displayed user comments are superimposed on the statically displayed user comments.

The "superimposing" herein is similar to the layer superimposing and aims at directly superimposing the second plurality of user comments on the static comment area, so as to simultaneously display the statically displayed first plurality of user comments and the dynamically displayed second plurality of user comments in the comment area.

Dynamic display is a display in which a certain content is displayed on the screen in a certain way for a period of time and then disappears in a certain way. For example, a user comment can enter from one side of the comment area, drifts horizontally to the other side and leaves. The dynamic display also allows a certain content to fly in with an animation effect and fly out later, or to disappear after display for a certain period of time at a certain position on the screen, and the like. There is no restriction on the specific form of dynamic display herein. The dynamically displayed user comments may have the format of a user ID plus the content of a user comment, and may also contain other information, such as the information about user level which follows the user ID, and the like.

The second plurality of user comments are selected according to the second rule and may be selected from all user comments, or may be further selected from the first plurality of user comments that have been selected. Wherein, the second rule refers to the rule for selecting and/or displaying the second plurality of statically displayed user comments, and the second rule can be similar with the first rule and based on but not limited to the above-mentioned number of positive comments on a user comment, the number of negative comments on a user comment, the time when the user comments were posted, and the level of users who posted the user comments, and the like.

The dynamic display can increase the exposure rate of the user comments and of the commenting users, thereby playing a role of encouraging users to comment, inspiring users to post high-quality comments, and encouraging the commenting users to show off. For example, according to the time when user comments were posted, the newly-posted user comments are displayed as a second plurality of dynamically displayed user comments, so as to inspire the users to post new comments for an exposure opportunity; or according to the number of positive comments on a user comment, the user comments most highly supported or liked by other users are dynamically displayed, so as to encourage users to post high-quality comments; alternatively, users with the highest user level may be displayed dynamically, so as to bring more exposure opportunities for these users, so as to indirectly reward high-quality commenting users.

When a user checks a certain content, the server may check the user comments under the content from the database in response to the user's operation, select a second plurality of user comments according to a second rule, and send the second plurality of user comments and related data or information to a mobile terminal for dynamic display on the comment area.

In order to enable the users to, in the comment area, simultaneously view multiple user comments that are displayed in diversified manners, the first rule and the second rule for selection at the same time point may be the same, but are preferably different or at least not identical. Correspondingly, the first plurality of user comments and the second plurality of user comments respectively selected according to the first rule and the second rule may be the same, but are preferably different or at least not identical.

Assuming that the first plurality of user comments are displayed according to the time when the user comments were posted, the second plurality of user comments are preferably displayed according to a different rule, such as the number of positive comments on a user comment, or the second plurality of user comments may be displayed according to the user level, or it is also possible to assign weights to: the time when the user comments were posted, the number of positive comments on a user comment, and the user level, and to select the second plurality of user comments to be displayed in accordance with the weights.

In addition, the first rule and/or the second rule may be dynamically adjusted according to differences in existing user comment data under different contents. For example, when there is a small amount of data of all user comments posted under a certain content, the selection rule can be appropriately broadened so that multiple or even all user comments can be displayed in the comment area at a same time point. When there is a large amount of data of all user comments posted under a certain content, the corresponding selection rule will be made strict (for example, the number or percentage of selected user comments is limited) so as to, from all user comments, select more excellent user comments or those user comments capable of motivating users. In addition, the first rule and the second rule may be rotated, for example, within a period of time, statically displaying the recent comments while dynamically displaying the appraised comments; and in a subsequent time period, statically displaying the appraised comments while dynamically displaying the recent comments, and the like.

It should be understood that the above examples are schematic, and multiple user comments may be selected according to other suitable rules to achieve the purpose of the comment display of the present invention.

The second plurality of user comments may be grouped for display, wherein, each group of comments from the second plurality of user comments are selected according to at least one of the following: number of positive comments on a user comment, the number of negative comments on a user comment, the time when the user comments were posted, and the level of users who posted the user comments. The selection of the second plurality of user comments may follow a certain selection rule. For example, the second plurality of user comments may quantitatively consist of N recent comments, M praised comments, and comments of high-quality users. Multiple groups of different comments from the second plurality of user comments are dynamically displayed in a rolling format. For example, according to the selection rule of the second plurality of user comments, the data of all user comments under a certain content may be periodically calculated; after each group sequentially fetches a certain number of multiple user comments, the group of user comments are dynamically displayed in the comment area; after one group of user comments are displayed, the next group of user comments are displayed.

The dynamic mode or display mode of different groups of user comments may also be different. For example, the first group may be dynamically displayed in the form of barrages, while the second group may be dynamically displayed with an animation effect, and the third group may disappear after display for a certain period of time at a certain position on the screen, and the like. Different colors and fonts can also be used to distinguish different groups of user comments.

The second plurality of user comments may also allow a hybrid presentation of different groups of comments. For example, the proportions and positions of praised comments, recent comments, and high-level user comments may be maintained on screen according to certain rules, such as by color or by the symbol after a user ID for distinguishing. In the case where many users are participating in the commenting and lively discussion, for example, the dynamic display rule may also be switched to a real-time display of the recent comments, thereby enhancing the sense of presence in participation of users.

In order to encourage a large number of users to post high-quality comments, other users may reward any of the second plurality of user comments after viewing the same. Rewards can come in many forms, such as giving virtual currency, giving gifts, and more. Rewards received by other users can also be displayed in the comment area, so as to encourage more users to actively post high-quality comments.

In addition, the comment area as mentioned above can be a public screen comment area displayed separately from a commented content. Here, "public screen" may refer to a public comment screen displayed separately from a commented content (for example, a piece of news), and a public comment area is a comment area on the public comment screen. Unlike the existing comment area that is usually located behind a commented content, the public screen comment area may only display comments, such as user comments and other related data selected according to the first rule or the second rule. In this way, the user comments screened into the public comment area can effectively improve the display of high-quality user comments, so as to inspire more users to sign up or actively post user comments.

Thus, the comment display method of the present invention has been described in detail with reference to FIG. 2 and the above embodiment. The comment display method of the present invention can also be implemented by a comment display system.

Figure 3:
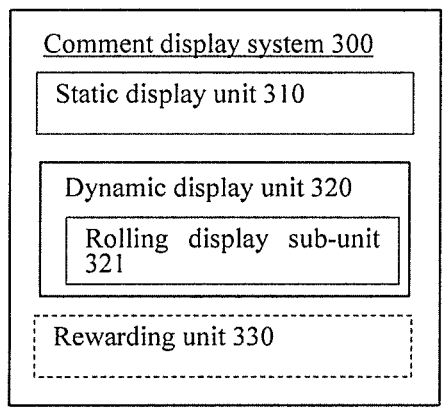
FIG. 3 shows a schematic block diagram of a comment display system according to an embodiment of the present invention.

FIG. 3 shows a structural block diagram of a comment display system according to an embodiment of the present invention. Wherein, the functional modules of the comment display system 300 may be realized by any hardware, software, or a combination of hardware and software that implements the principles of the present invention. Those skilled in the art can understand that the functional modules illustrated in FIG. 3 can be combined or divided into sub-modules so as to implement the above-mentioned invention principles. Accordingly, the description herein may support any possible combination, or division, or further definition of the functional modules described herein.

The comment display system 300 shown in FIG. 3 can be used to implement the comment display method shown in FIG. 2. The following only briefly describes the function modules that the comment display system 300 can have and the operations that each function module can perform. For details, please refer to the description above with reference to FIG. 2, which will not be described here.

As shown in FIG. 3, the comment display system 300 of the present invention may comprise a static display unit 310 and a dynamic display unit 320. Wherein, the static display unit 310 can be used for, in a comment area of a display page, statically displaying a first plurality of user comments arranged according to a first rule. The dynamic display unit 320 can be used for, on the statically displayed user comments, superimposing a second plurality of dynamically displayed user comments, wherein, the second plurality of user comments can be selected according to a second rule.

The dynamic display unit 320 is capable of various types of dynamic display, for example, user comments can be displayed in the form of barrages, that is, entering from one side of the comment area, drifting horizontally to the other side and leaving.

Similarly, the first rule and the second rule may be specified according to at least one of the following: the number of positive comments on a user comment, the number of negative comments on a user comment, the time when the user comments were posted, and the level of users who posted the user comments. In one embodiment, the first rule and the second rule at a same time point can be the same, but preferably are at least not exactly the same, so that the first plurality of user comments selected according to the first rule and the second plurality of user comments selected according to the second rule are at least not exactly the same.

The dynamic display unit 320 further comprises a rolling display sub-unit 321, and the rolling display sub-unit 321 dynamically displays multiple groups of different comments from the second plurality of user comments in a rolling format, wherein, each group of comments from the second plurality of user comments are selected according to at least one of the following: the number of positive comments on a user comment, the number of negative comments on a user comment, the time when the user comments were posted, and the level of users who posted the user comments.

The comment display system 300 can optionally comprise: a rewarding unit 330, used for selecting any of the second plurality of user comments and giving a reward.

Figure 4:
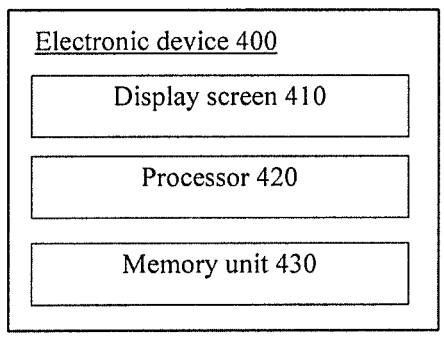
FIG. 4 shows a schematic block diagram of an electronic device according to an embodiment of the present invention.

The comment display method of the present invention can also be implemented by an electronic device. FIG. 4 shows a schematic block diagram of an electronic device 400 according to an embodiment of the present invention. Wherein, the electronic device 400 may be the mobile terminal 10 shown in FIG. 1.

As shown in FIG. 4, the electronic device of the present invention can comprise a display screen 410, a processor 420, and a memory unit 430. On the memory unit 430, an executable code is stored, and when the executable code is executed by the processor 420, the processor 420 will execute the above-mentioned comment display method, so that a comment display will be realized on a display page of the display screen 410.

A plurality of the above-mentioned electronic devices 400 may also be combined with a server and its corresponding database to form a comment display system according to the present invention. In other words, the environment shown in FIG. 1 can also be regarded as a specific configuration implementation of the comment display system of the present invention. In the database, the server stores in real time and updates the user comments and related information based on various types of content, and pushes these comments and information to the electronic device 400 according to certain rules. The electronic device 400 can then perform the comment display method as described above, thereby realizing the dynamic and static comment superimposing, and enriching the user experience in browsing and participating in comments.

Application Example

Figure 5:
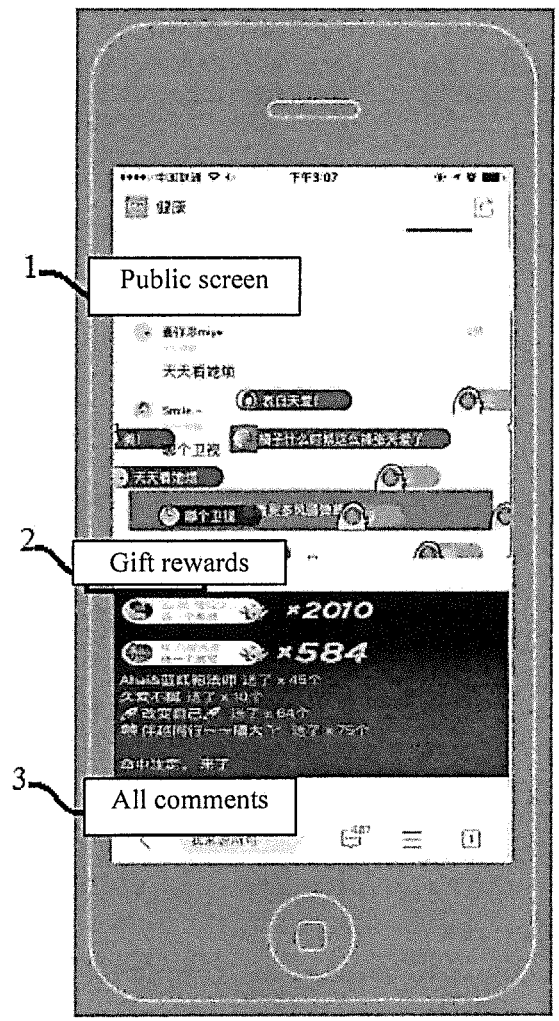
FIG. 5 shows an effect diagram of an example.

FIG. 5 shows an effect diagram of an example. As shown in FIG. 5, a public screen 1 is set on a display page, and a plurality of user comments are statically displayed on the public screen 1, and a plurality of user comments displayed in the form of barrages are superimposed. A user can, on the public screen, simultaneously view a plurality of user comments selected according to different rules.

On the display page, a portion for gift rewards 2 is displayed at the same time, and a user can view the rewards given by other users in this portion.

All comments 3 that are different from the public screen 1 constitute a comment area common in the prior art. Here, all the user comments on a commented content may be included. When a user needs to view all the user comments, the "all comments" button may be clicked, so as to display all user comments on the display page.

Therefore, through the multiple user comments statically displayed and dynamically displayed in the public comment area, the display of user comments can be diversified, so as to encourage users to actively post comments and further obtain exposure opportunities. Furthermore, rewards for high-quality user comments further motivate users to actively post high-quality comments.

The comment display method, the comment display system, the electronic device, and the readable storage medium according to the present invention have been described above in detail with reference to the accompanying drawings. The comment display solution of the present invention enables superimposing of dynamically displayed user comments on the statically displayed user comments so that a comment area of a display page can simultaneously display a plurality of user comments selected according to different rules, thereby diversifying a comment display and promoting an active and interactive commenting atmosphere. Other users can reward user comments that are displayed dynamically, so that quality commenting users can be recognized, thereby inspiring users to actively post high-quality comments.

In addition, the method according to the present invention can also be implemented as a computer program, wherein, the computer program comprises computer program code instructions for performing the above steps defined in the above-described method of the present invention. Alternatively, the method according to the present invention can also be implemented as a computer program product, wherein, the computer program product comprises a computer readable medium, and on the computer readable medium, a computer program is stored for performing the above functions defined in the above-described method of the present invention.

Alternatively, the present invention can also be implemented as a non-transitory machine-readable storage medium, or a computer readable storage medium, on which an executable code, a computer program or a computer instruction code is stored, and when the executable code, the computer program or the computer instruction code is executed by the processor of the electronic device, the processor will execute the above-mentioned comment display method.

Those skilled in the art will also understand that various exemplary logical blocks, modules, circuits, and algorithm steps described in connection with the disclosure herein may be implemented as an electronic hardware, a computer software, or a combination of both.

The flowchart and block diagrams in the figures illustrate the architecture, functionality, and operation that can be realized by the system and method in accordance with multiple embodiments of the present invention. In this regard, each block in the flowchart or block diagram may represent a module, a program portion, or a code portion, wherein, the module, the program portion or the code portion may include one or more executable instructions for implementing prescribed logic functions. It should also be noted that in some alternative implementations, the functions marked in the blocks may also occur in a different order than is marked in the figures. For example, two consecutive blocks may actually be executed substantially in parallel, and may sometimes be executed in the reverse order, depending on the function involved. It should also be noted that each block in the block diagrams and/or flowcharts, and a combination of the blocks in the block diagrams and/or flowcharts, can be implemented by a dedicated hardware-based system that perform the specified functions or operations, or by a combination of a dedicated hardware and computer instructions.

Various embodiments of the present invention have been described above, and the above description is exemplary, not exhaustive, and is not limited to the disclosed embodiments. Many modifications and variations without departing from the scope and spirit of the described embodiments would be apparent to those of ordinary skill in the art. The terminology used herein was chosen to best explain the principles of the various embodiments, the practical application or the improvement of technology in the marketplace, or to enable others of ordinary skill in the art to understand the embodiments disclosed herein.

The invention claimed is:

1. A comment display method, comprising:
   statically displaying a first plurality of user comments simultaneously in a comment area of a display page, wherein the first plurality of user comments are selected according to a plurality of selection modes of a first rule, wherein a plurality of weight values are assigned to the plurality of selection modes;
   dynamically displaying a second plurality of user comments by superimposing the second plurality of user comments on top of the statically displayed first plurality of user comments, wherein the second plurality of user comments are selected according to a second rule; and
   rotating the first rule and the second rule, comprising:
      statically displaying the second plurality of user comments; and
      dynamically displaying the first plurality of user comments.

2. The comment display method as specified in claim 1, wherein dynamically displaying the second plurality of user comments comprises causing the second plurality of user comments to enter from a first side of the comment area, drift horizontally to a second side and leave.

3. The comment display method as specified in claim 1, wherein the first rule and the second rule are formulated based on at least one of the following: a number of positive comments on a user comment, a number of negative comments on a user comment, a time when user comments were posted, and a level of users who posted the user comments, and wherein the first rule and the second rule at a same time point are at least not the same, and wherein the first plurality of user comments selected according to the first rule and the second plurality of user comments selected according to the second rule are at least not the same.

4. The comment display method as specified in claim 1, wherein dynamically displaying the second plurality of user comments on top of the statically displayed first plurality of user comments comprises:
   generating a first comment group and a second comment group from the second plurality of user comments;
   dynamically displaying the first comment group and the second comment group, wherein each comment group from the second plurality of user comments is selected according to at least one of the following: a number of positive comments on a user comment, a number of negative comments on a user comment, a time when user comments were posted, and a level of users who posted the user comments, wherein a first display mode of the first comment group is different from a second display mode of the second comment group.

5. The comment display method as specified in claim 1, wherein when dynamically displayed, any of the second plurality of user comments can be selected and rewarded by other users.

6. The comment display method as specified in claim 1, wherein the comment area is a public screen comment area displayed separately from a commented content.

7. The comment display method of claim 1, further comprising:
   dynamically adjusting the first rule and the second rule according to differences in user comment data under different contents.

8. The comment display method of claim 1, wherein the second plurality of user comments are selected from the first plurality of user comments.

9. A comment display system, comprising:
   a static display unit configured to statically display a first plurality of user comments simultaneously in a comment area of a display page, wherein the first plurality of user comments are selected according to a plurality of selection modes of a first rule, wherein a plurality of weight values are assigned to the plurality of selection modes; and
   a dynamic display unit configured to dynamically display a second plurality of user comments by superimposing the second plurality of user comments on top of the statically displayed first plurality of user comments, wherein the second plurality of user comments are selected according to a second rule,
wherein the static display unit is further configured to statically display the second plurality of user comments, wherein the dynamic display unit is further configured to dynamically display the first plurality of user comments.

10. The comment display system of claim 9, wherein the second plurality of user comments are selected from the first plurality of user comments.

11. The comment display system as specified in claim 9, wherein the dynamic display unit is capable of dynamically displaying user comments entering from a first side of the comment area, drifting horizontally to a second side and leaving.

12. The comment display system as specified in claim 9, wherein the dynamic display unit further comprises a rolling display sub-unit, and the rolling display sub-unit dynamically displays multiple groups of different comments from the second plurality of user comments in a rolling format, wherein each group of comments from the second plurality of user comments is selected according to at least one of the following: a number of positive comments on a user comment, a number of negative comments on a user comment, a time when user comments were posted, and a level of users who posted the user comments.

13. The comment display system as specified in claim 9, further comprising:
   a rewarding unit configured to select any of the second plurality of user comments and giving a reward.

14. The comment display system of claim 9, wherein the static display unit is further configured to dynamically adjust the first rule according to differences in user comment data under different contents, wherein the dynamic display unit is further configured to dynamically adjust the second rule according to the differences in the user comment data under the different contents.

15. An electronic device, comprising:
   a display screen;
   a processor; and
   a memory unit storing an executable code, and wherein when the executable code is executed by the processor, the processor executes the comment display method as specified in claim 1 so that a comment display will be realized on the display page of the display screen.

16. A non-transitory machine-readable storage medium storing an executable code, and wherein when the executable code is executed by a processor of an electronic device, the processor executes the comment display method as specified in claim 1.

* * * * *